Figure 1A:
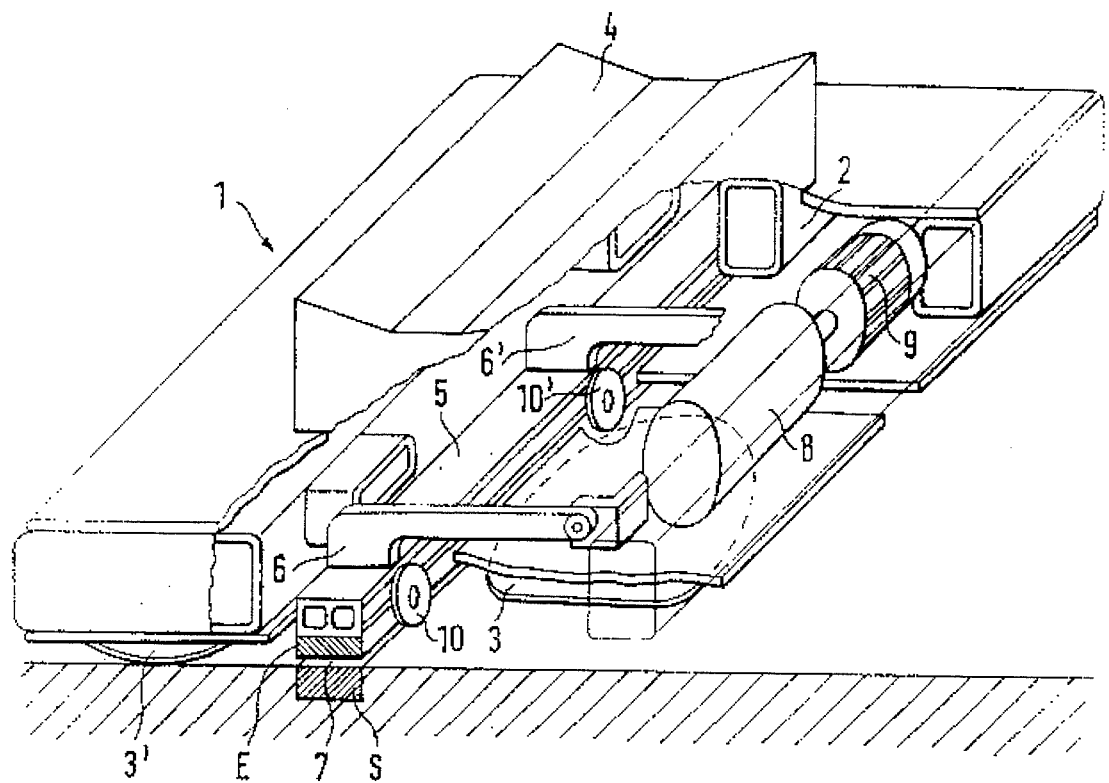

United States Patent [19]

Richert et al.

[11] Patent Number: 5,542,356
[45] Date of Patent: Aug. 6, 1996

[54] TRACK-GUIDED TRANSPORT VEHICLE

[76] Inventors: Withold Richert, Am Hackeberg 34, 41836 Hückelhoven; Andreas Gründl, Haseneystrasse 20, 81377 München; Bernhard Hoffmann, Jakob-Tresch-Strasse 9, 82319 Starnberg, all of Germany

[21] Appl. No.: 190,095

[22] PCT Filed: Aug. 7, 1992

[86] PCT No.: PCT/EP92/01805

§ 371 Date: Oct. 19, 1994

§ 102(e) Date: Oct. 19, 1994

[87] PCT Pub. No.: WO93/02889

PCT Pub. Date: Feb. 18, 1993

[30] Foreign Application Priority Data

Aug. 9, 1991 [DE] Germany ............ 41 26 453.3

[51] Int. Cl.⁶ ........................................... B61L 1/00
[52] U.S. Cl. ............... 104/289; 104/23.1; 104/130.02; 104/292; 104/293; 105/35; 191/10
[58] Field of Search ............... 104/23.2, 290, 104/292, 293, 294, 291, 23.1, 281, 282, 286, 289; 318/135, 687, 723; 310/12; 307/1, 3, 8, 27, 73; 105/35; 191/10

[56] References Cited

U.S. PATENT DOCUMENTS

| 3,385,228 | 5/1968 | Chung | 104/293 |
|---|---|---|---|
| 3,460,485 | 8/1969 | Easton | 104/293 |
| 3,516,361 | 6/1970 | Hart | 104/293 |
| 3,626,858 | 12/1971 | Colling | 104/293 |
| 3,680,489 | 8/1972 | English | 104/293 |
| 3,874,300 | 4/1975 | Payen | 104/293 |
| 4,635,560 | 1/1987 | Ballantyne | 104/292 |
| 5,115,173 | 5/1992 | Kobayashi et al. | 104/293 |
| 5,117,136 | 5/1992 | Kobayashi et al. | 104/293 |

*Primary Examiner*—Mark T. Le
*Attorney, Agent, or Firm*—William W. Jones

[57] ABSTRACT

A track-guided transport vehicle system for transporting high loads along a travel path contains for the drive a synchronous linear drive with a long stator along the travel path and an exciter winding on the vehicle. The long stator generates a travelling field that cooperates with a static magnetic field generated by an exciter winding on the vehicle so as to propel the vehicle. In order to supply electric drive energy to the compressor unit serving to generate compressed air for the air cushions, a higher frequency alternating current is superimposed on the current supplied to the windings along the track, with the higher frequency alternating current being coupled by a transformer effect into the winding on the vehicle. The energy can be coupled out there by means of a rectifier and be made available for feeding the electric motor of the compressor unit.

7 Claims, 3 Drawing Sheets

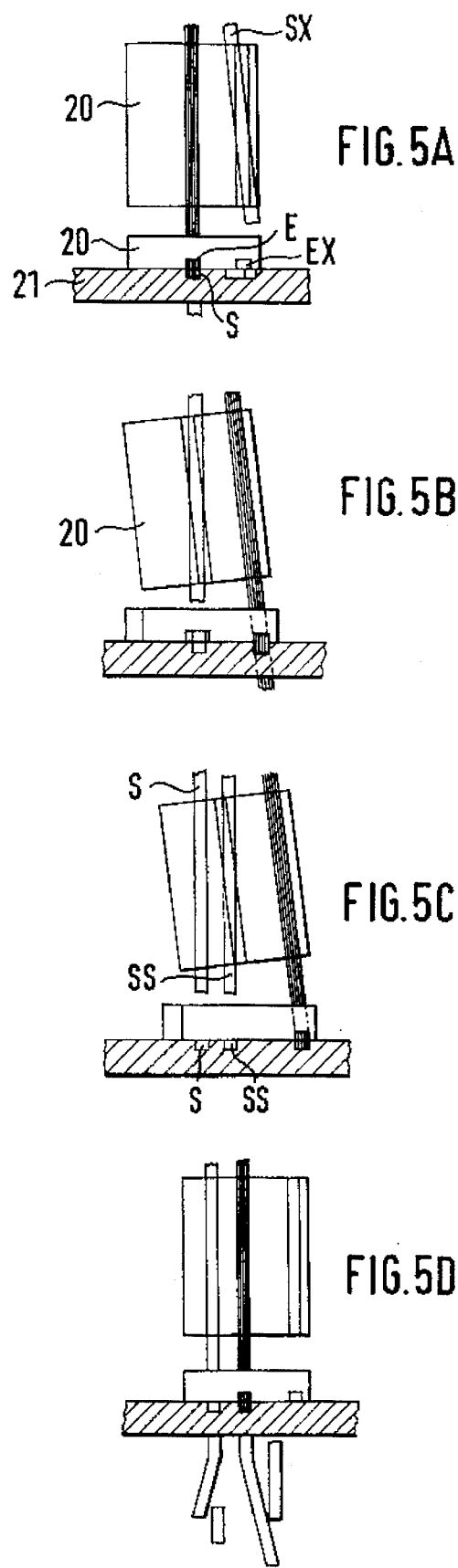
FIG.5A
FIG.5B
FIG.5C
FIG.5D
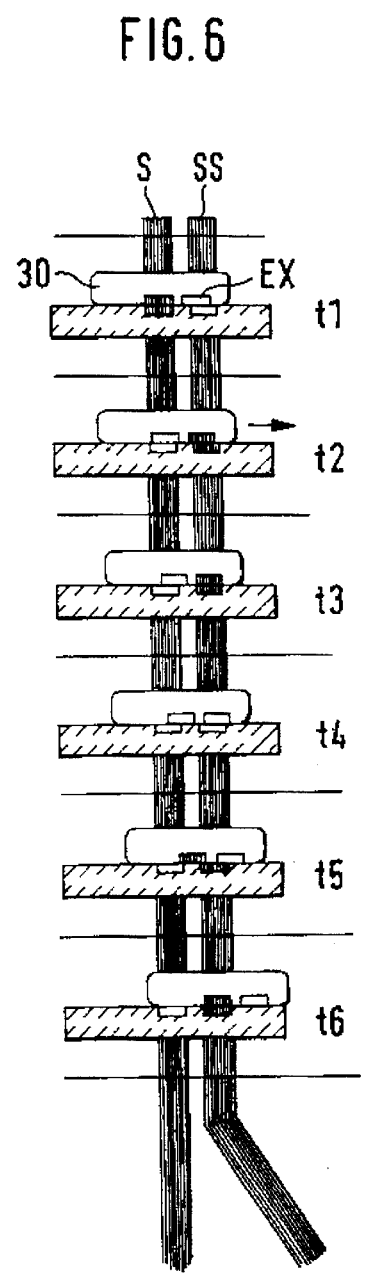
FIG.6

TRACK-GUIDED TRANSPORT VEHICLE

The invention relates to a track-guided transport vehicle.

In general it is concerned with transport devices and so-called driverless transport systems (FTS) for heavy loads.

The load transport systems used currently in production plants and the like usually are systems with transport units guided via a guiding wire, i.e. track-guided systems. However, the vehicles designed for higher loads run on principle on wheels and are driven by diesel engines or battery-powered electric motors.

The present invention is concerned specifically with vehicles capable of transporting loads of more than 1,000 kg.

In case of diesel engine drives, the environment is heavily loaded by the exhaust gases, and such loads are not acceptable in many production plants, store-houses and the like. In case of battery-powered electric motors, a considerable expenditure is necessary for making available the transportation energy, i.e. continuous recharging and maintenance of the batteries is necessary. The storage expenditure is considerable.

For higher loads, vehicles carrying the load via air cushions filled with compressed air and driven by means of a friction wheel are suited better. These transport vehicles are guided mechanically or by active or passive guide members in transport systems.

For supply of the air cushions, it is necessary to have compressed air, which is made available by following-up hose connections. However, the radius of action of such transport vehicles is very much restricted thereby. In addition thereto, the hose connections are inconvenient and are subject to high wear.

Another solution consists in providing the vehicle itself with compressors for generating compressed air and to electrically feed the compressors via following-up cables. As regards the range of action and the wear, similar restrictions result as in case of the hose connections. Furthermore, the cable strands to be routed along the paths of transportation also constitute a hindrance for work to be done in the range of the vehicle paths.

It is the object of the invention to indicate a track-guided transport vehicle designed specifically for transporting heavy loads, which is capable of travelling also long distances and does not display the problems present in diesel drives and battery drives.

To this end, the present invention provides a track-guided transport vehicle comprising an air cushion arrangement for taking up loads, an electrically driven compressor unit for generating compressed air, and a motor drive, in which the following features are realized:

the drive is designed as a synchronous linear drive, preferably with long stator and exciter part on the vehicle, and the electrical energy for the compressor unit is inductively transferred to the winding of the linear drive provided on the vehicle, by means of a higher frequency alternating current and a transformer effect.

When, as preferred, a long stator with individual stator sections is formed along the travel path, while an exciter part with direct current powered exciter winding is provided on the transport vehicle itself, the low frequency alternating current serving to generate a travelling field on the stator has a higher frequency alternating current superimposed thereon (this frequency is e.g. 10 times higher than the low frequency for the travelling field).

While the low frequency alternating current does not induce a voltage in the exciter winding, the higher frequency alternating current does induce a voltage in the exciter winding, which is coupled out at the vehicle and is available as energy for feeding the compressor unit. The energy required for direct current feeding of the exciter part also is transferred to the vehicle in the manner mentioned. A contact-free energy transfer is thus rendered possible in total.

It is in principle also possible to provide the stator on the vehicle and the exciter part on the travel path. The travelling field then will be produced at the stator on the side of the vehicle by alternating current supply, whereas the individual exciter windings along the travel path are fed with direct current. This direct current will then have the higher frequency alternating current superimposed thereon which is fed into the stator windings. However, in comparison with this embodiment, the afore-mentioned embodiment with long stator and exciter part on the vehicle is to be preferred since advantages result with respect to the control of the alternating current for the stator, as well as the deceleration and positioning of the vehicle.

The invention thus makes use of the known per se principle to support high loads by means of air cushions and to thereby render possible low-friction guiding of the vehicle. Furthermore, the invention makes use of a synchronous linear drive which is specifically combined with an inductive energy transfer via the parts of the linear drive. The two windings along the travel path and on the vehicle, respectively, can be referred to as the two windings of a cut-open transformer. In order to minimize the unavoidable losses at the air gap between the winding on the vehicle and the winding along the travel path, the winding on the vehicle is movably supported, while a distance wheel, a distance air cushion, a position-regulating power-assisted hydraulic system with corresponding displacement transducers or an electromagnetic arrangement (as in suspension control) is provided to keep distance from the winding at the path.

While in a usual linear drive the vehicle is carried by magnetic attraction and repulsion, which necessitates a considerable energy expenditure in case of high loads, the own weight of the vehicle as well as the load are taken up by the air cushion in the transport vehicle according to the invention. Thus, it is not necessary for the carrying force to supply additional electrical energy to the exciter winding located on the vehicle. The direct current supply to the exciter winding is made for generating a magnetic field cooperating with the travelling field of the long stator in order to propel the vehicle.

The energy in the form of the high frequency alternating current, coupled inductively into the winding on the vehicle, can be rectified and coupled out at the vehicle by means of a passive or active rectifier, so that the energy is available for driving the compressor unit and for direct current supply to the exciter winding on the vehicle.

A so-called active rectifier with pulse current rectifier is preferred for rectification. This pulse current rectifier does not only take over rectification of the high frequency alternating current in the exciter winding on the vehicle, but in addition thereto also takes over the adjustment of the direct current in the exciter winding.

The invention provides furthermore an arrangement for taking corners and points or switches. In the region of a switch, two stator sections are disposed parallel to each other with a certain distance, and an additional exciter part is provided on the vehicle. To make the (main) exciter part on the vehicle change over to the track formed by the additional stator in the ground, an auxiliary stator is provided in the switch region that is disposed obliquely with respect to the main stator and cooperates with the additional exciter part on the vehicle. For "changing track", the additional exciter part on the vehicle as well as the obliquely disposed auxiliary stator are switched on briefly, so that the vehicle experiences a lateral drive component.

When the (main) exciter part of the vehicle is then located above the new, branching long stator, the additional exciter part and the auxiliary stator in the ground are switched off again, and the (main) exciter part on the vehicle is switched on again in order to provide for the drive of the vehicle in conjunction with the long stator.

Moreover, "changing tracks" can also be effected in that two long stator sections are disposed parallel to each other at a first distance, and in that the vehicle has an additional exciter part disposed thereon whose distance from the (main) exciter part is different from the distance between the long stator sections.

For example, the distance between the two exciter parts on the vehicle may be smaller than the distance between the long stator sections. For changing tracks, the (main) exciter part as well as the long stator section powered so far are turned off, and the additional exciter part and the other, parallel long stator are turned on. The vehicle thereby is subjected to a transverse force, with the result that the additional exciter part is aligned with the other long stator. Subsequent to this transverse movement, switching back to the (main) exciter part can be performed on the vehicle, so that this (main) exciter part is attracted by the "new" long stator.

The measures described hereinbefore serve to obtain ramification in the travel path. Branches can be realized as well. While a branch to the left or to the right is realized in the manner elucidated hereinbefore, a bridging stator of relative short length is provided for movement of the vehicle in straight-on direction.

According to a broader aspect the invention also relates to a transport vehicle that is not necessarily provided with a synchronous linear drive, but in which the electrical energy for the compressor unit for the air cushion arrangement is inductively transferred to a winding provided on the vehicle, by means of a high frequency alternating current and a transformer effect. The vehicle thus may be driven e.g. with the aid of a friction wheel or the like. With this arrangement, too, an inductive energy transfer for the compressor unit is considerably more favorable than the measures elucidated at the beginning, e.g. feeding of the air cushion arrangement via compressed air hoses or the like.

Figure 1B:
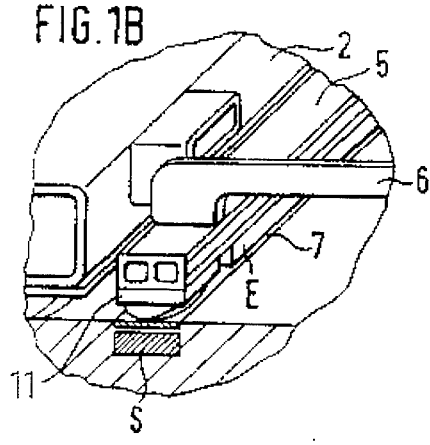
Figure 1C:
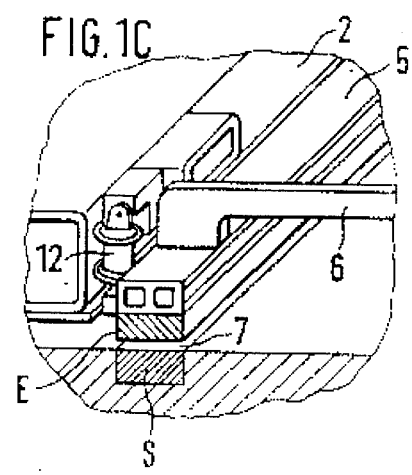
Figure 2:
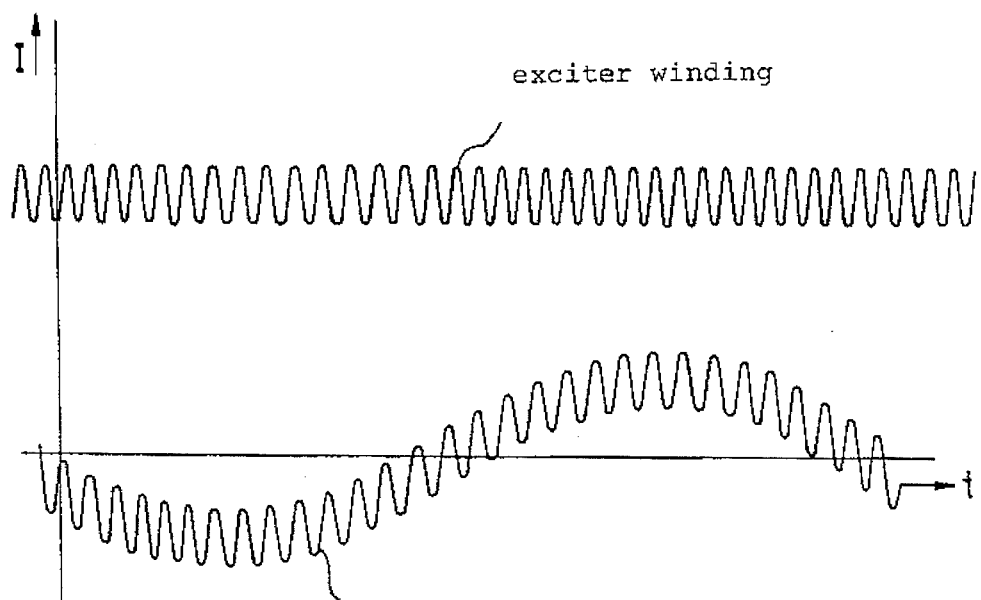
Figure 3:
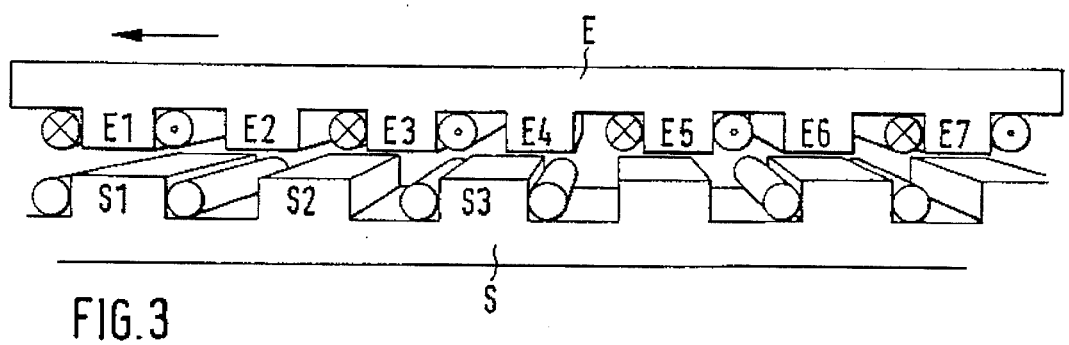
Figure 4:
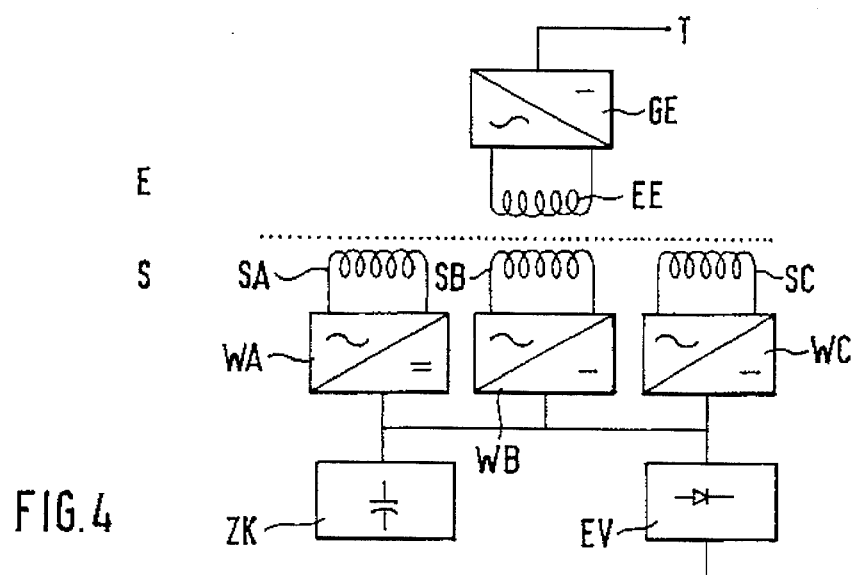

Embodiments of the invention will be elucidated in the following in more detail on the basis of the drawings in which FIG. 1A shows a perspective view of a transport vehicle with air cushions and synchronous linear drive, FIG. 1B shows a partial view of a vehicle similar to the vehicle according to FIG. 1A, however with small air cushions being provided for support in FIG. 1B, FIG. 1C shows a view similar to that of FIG. 1B, with the supporting air cushions shown therein being replaced with respect to their function by a hydraulic cylinder and a power-assisted hydraulic system, FIG. 2 shows the current curve in the stator winding and in the exciter winding of a synchronous linear drive used for driving the transport vehicle, FIG. 3 shows a schematic perspective view of part of a stator located along the travel path of the transport vehicle, as well as the exciter part on the transport vehicle located above this part of the stator, and FIG. 4 shows a schematic view of a synchronous linear drive with inductive energy transfer from the stator S to the vehicle carrying the exciter part E, FIG. 5 shows a schematic sketch for illustrating "changing of tracks" of a vehicle of the type illustrated in FIG. 1, and FIG. 6 shows an alternative embodiment of a switch for "changing tracks".

FIG. 1A shows in a perspective view a transport vehicle 1 with air cushions. It is composed of a supporting structure 2, load air cushions 3 and 3' and a load take-up 4 (formed here as a prism).

A long stator S is embedded in the ground such that the surface of the long stator and the surface of the ground are located in one plane.

The exciter winding E movably attached to the supporting structure 2 by means of levers 6 and 6' and a traversing member 5 is disposed above long stator S and is track-guided by the magnetic forces of the linear motor. Additional track-guiding, e.g. mechanically, thus is not necessary any more.

In order to keep the air gap 7 between long stator S and exciter winding E as small and as constant as possible, the traversing member 5 of the exciter winding E is supported by distance wheels 10 and 10'.

Another possibility of keeping the air gap 7 between long stator S and exciter winding E as small and as constant as possible consists according to FIG. 1B in that small supporting air cushions 11 are arranged underneath the traversing member 5 of the exciter winding E.

However, according to FIG. 1C, the air gap 7 between long stator S and exciter winding E may also be regulated in terms of position by hydraulic cylinders 12 and a power-assisted hydraulic system (not shown here).

For supplying compressed air to the load air cushions 3 and 3' and the small supporting air cushions 11, a compressor unit 8 with an electric motor 9 is arranged within supporting structure 2. Electric motor 9 is powered by the exciter part E. The compressed air generated in compressor unit 8 is supplied to the air cushions 3 and 3' via connecting tube lines (not shown here). The air cushions are inflated, lift the transport vehicle together with the load and carry vehicle as well as load.

The vehicle with the load is moved along long stator S along with the travelling field of the linear motor.

In the following, the synchronous linear drive used for moving the transport vehicle shown in FIG. 1 will be elucidated in more detail with reference to FIGS. 2 to 4, with the energy coupled out in the vehicle or moving part being used to feed the electric motor 9 of the compressor unit 8.

FIG. 4 schematically shows the arrangement of a synchronous linear drive with the long stator S indicated generally underneath the dotted line, consisting of a plurality of stator sections disposed one after the other and each having a stator winding SA, SB and SC which in turn are each connected to an inverter WA, WB and WC, respectively. The inverters are powered by an energy supply EV via an intermediate circuit ZK. In doing so, the stator windings of the individual sections are driven by a control, not shown, such that only that stator coil has current supplied thereto above which the exciter winding EE of the vehicle is located. In the exciter part, the exciter winding EE is connected to a rectifier GE at whose output energy can be coupled out. This energy is available for the compressor unit 8 on the transport vehicle 1. In addition thereto, the energy inductively coupled into the exciter winding EE is available as supply energy for the exciter winding.

In order to drive the vehicle of a linear drive, a direct current is fed into the exciter winding. The travelling field is produced by the individual winding of the stator, i.e. here by the stator windings SA, SB and SC.

The inverters WA, WB and WC as well as the control connected thereto, not shown, effect in addition to the generation of a travelling field that a higher frequency alternating current is superimposed on the alternating current serving to generate the travelling field and having a relatively low frequency. While the low frequency alternating current serves only to make available the energy for the propulsive force, but does not induce a voltage in the exciter winding, the higher frequency alternating current share serves to induce a voltage in the exciter winding EE, which can be understood as a secondary winding of a transformer consisting of a stator winding, in the present case stator winding SB, and the exciter winding EE as well as the air gap located therebetween.

FIG. 2 shows the current curve in the stator winding (lower curve) and in the exciter winding (upper curve). It can be seen that the low frequency alternating current, which is fed into the individual stator coils for propulsion, has a higher frequency alternating current superimposed thereon. This higher frequency alternating current has the function to inductively couple energy into the exciter winding. An alternating current is induced in the latter which is detuned only by the fundamental wave of the low frequency alternating current used to generate the travelling field.

FIG. 3 schematically shows part of the stator S and an exciter part E. The exciter part is moved to the left in FIG. 3 by generating, by direct current supply, a travelling field in the stator S and a static magnetic field in the exciter part.

According to the illustration in FIG. 3, a pole E1 at the exciter part and a pole S2 at the stator are located opposite each other. In this region, an optimum coupling of the higher frequency share into the exciter winding takes place on the side of the stator. There is also a coupling effect between S1 and E2, however this effect is lower, but becomes stronger with increasing approximation between S1 and E2. The effect obtained by position-dependent phase reversal of the higher-frequency alternating current serving for energy transfer is that an in-phase alternating current is always induced in the exciter winding, i.e. that the shares from the individual portions add up.

The elements shown in FIG. 3 are provided anyway in a usual synchronous linear motor.

A modified embodiment of the invention may be provided with additional windings, in particular with windings on the exciter part, in addition to the elements present anyway in a synchronous linear motor.

The rectifier GE illustrated schematically in FIG. 4 serves as a so-called active rectifier. In addition to the function of rectifying the higher frequency alternating current induced in the exciter winding, the rectifier furthermore also has the function of adjusting the direct current to be fed to the exciter winding. By a corresponding adjustment of the energy flow, it is also possible to obtain an energy transfer in the opposite direction, i.e. a transfer of energy from the exciter part E to the stator S.

In another embodiment of the invention, the conditions elucidated hereinbefore and depicted in FIG. 4 are the other way round: the "stator" is located on the vehicle while exciter windings are disposed along the travel path. The travelling field then will be produced on the vehicle.

FIG. 5 shows separate phases when travelling across a switch. FIGS. 5A to 5D each show a vehicle in a plan view and in a cross-sectional view.

As shown in FIG. 5A, a vehicle 20 having a synchronous linear drive runs along a travel path defined by a long stator S embedded in the ground 21. According to FIG. 5A, the long stator S and the exciter winding E, referred to as (main) exciter part in the following, are switched on. In the region of the switch to be described in more detail hereinafter an auxiliary stator SX is disposed obliquely beside the long stator S at an acute angle thereto. An additional exciter part EX on the vehicle is located opposite said auxiliary stator.

According to FIG. 5B, switching over takes place to the auxiliary long stator SX and the additional exciter part EX so that the vehicle 20 receives a lateral driving component.

While running on, the vehicle 20 then reaches a region where a long stator SS of a branching track is disposed in parallel beside the long stator S of the track travelled so far. Due to the lateral displacement of the vehicle, the (main) exciter part E will be disposed above the new long stator SS after a certain period of time. According to FIG. 5D, switching back to the (main) exciter part on the vehicle is effected, and switching over from the long stator S to the long stator SS takes place. According to FIG. 5D, the vehicle thus continues its ride on the right-hand track.

Without the afore-described switching operations, the vehicle would continue its ride in FIG. 5D to the lower left.

Instead of the above-described bifurcation, it is also possible to provide a branch to the left and/or to the right in addition to a track for running straight on. A short bridging stator for running straight on may then be disposed in the region of the branch.

FIG. 6 shows an alternative form of a switch or point. The two long stators S and SS extend parallel to each other for a certain distance and at a certain first spacing. In addition to the (main) exciter part, an additional exciter part EX is provided on the vehicle 30. The two exciter parts are spaced apart by a smaller distance than the two long stators S and SS.

As outlined in FIG. 6 by individual time sections, the vehicle 30 in the region of the switch travels in the longitudinal direction of the long stators S and SS, and for the time being, the (main) exciter part on the vehicle 30 and the long stator S are turned on. For changing tracks, these two parts are then turned off, and the long stator SS and the additional exciter part EX are turned on. The result hereof is that, in period t2, the vehicle is accelerated towards the right in FIG. 6 and, at a certain moment t3, assumes a position in which the long stator SS is aligned with the additional exciter part EX.

When all coils are turned off now, the vehicle due to is mass inertia continues to move towards the right, so that the (main) exciter part approaches long stator SS. These two parts are then turned on in period t5. Due to the attraction, the vehicle now has its (main) exciter part positioned on the track defined by the long stator SS.

The above-elucidated principle can also be developed further such that the vehicle is not only displaced laterally, but is also turned.

In a further embodiment, the invention provides a transport vehicle having an air cushion arrangement, in which however a different drive may be provided instead of the linear drive. When looking at FIG. 1, the linear motor shown there and comprising the long stator S and the exciter winding E may be replaced by a friction wheel drive. However, with this arrangement, too, the transfer of electrical energy to the compressor unit 8 feeding the air cushions 3, 3' according to the invention takes place by a transformer effect via one or more coil units embedded in the ground and a winding on the vehicle.

We claim:

1. A guided transport vehicle system comprising:
   a) a vehicle assembly
   b) air cushion means for supporting the vehicle assembly and loads on said vehicle assembly;

c) electrically driven compressor means for generating compressed air for said air cushion means;

d) a synchronous electric linear drive, said drive including a first long stator disposed along a path of travel of the vehicle assembly, said first stator having stator windings powered by alternating current to generate a traveling field for driving the vehicle assembly along said path of travel;

e) at least one exciter means having an exciter winding powered by direct current to provide an electrical energy supply which is inductively transferred to the vehicle assembly via said stator windings;

f) means for superimposing a high frequency alternating current on the alternating current which powers said stator windings, so as to generate a propulsion force for the vehicle assembly; and g) means on said exciter means for transferring energy induced at said exciter winding by the high frequency alternating current to said compressor means to operate the latter.

2. The transport vehicle system of claim 1 wherein said exciter winding is movably mounted on said vehicle assembly.

3. The transport vehicle system of claim 1 further comprising means for establishing a predetermined gap between said first long stator and said exciter means.

4. The transport vehicle system of claim 3 wherein said means for establishing a predetermined gap is an hydraulic cylinder mounted on said vehicle assembly.

5. A guided transport vehicle system comprising:

a) a vehicle assembly;

b) air cushion means for supporting the vehicle assembly and loads on said vehicle assembly;

c) electrically driven compressor means for generating compressed air for said air cushion means;

d) a synchronous electric linear drive, said drive including a first long stator disposed along a path of travel of the vehicle assembly, said first long stator having stator windings powered by alternating current to generate a traveling field for driving the vehicle assembly along said path of travel;

e) at least one exciter means having an exciter winding powered by direct current to provide an electrical energy supply which is inductively transferred to the vehicle assembly via said stator windings;

f) means for superimposing a high frequency alternating current on the alternating current which powers said stator windings, so as to generate a propulsion force for the vehicle assembly;

g) means on said exciter means for transferring energy induced at said exciter winding by the high frequency alternating current to said compressor means to operate the latter; and h) switching means for changing the path of travel of said vehicle assembly, said switching means comprising a second long stator having a first portion which is substantially parallel with said first long stator, and a second portion which diverges away from said first long stator; and auxiliary exciter means mounted on said vehicle assembly, said auxiliary exciter means being operable, when energized, to provide a transverse force which aligns said exciter means with said first portion of said second long stator.

6. The transport vehicle system of claim 5 wherein said auxiliary exciter means is spaced apart from said exciter means by a distance which is slightly less than the distance between said first long stator and said first portion of said second long stator.

7. A guided transport vehicle system comprising:

a) a vehicle assembly;

b) air cushion means for supporting the vehicle assembly and loads on said vehicle assembly;

c) electrically driven compressor means on said vehicle assembly for generating compressed air for said air cushion means;

d) an electric motor on the vehicle assembly for powering said compressor means; and e) means on said vehicle assembly for inductively supplying electrical energy to said electric motor from a source of high frequency alternating current superimposing on a source of low frequency alternating current disposed along a path of travel of the vehicle assembly.

* * * * *